United States Patent [19]

Yamada

[11] Patent Number: 4,471,860
[45] Date of Patent: Sep. 18, 1984

[54] ELECTROMAGNETIC CLUTCH

[75] Inventor: Toshiaki Yamada, Higashiosaka, Japan

[73] Assignee: Matsushita Electric Industrial Co., Ltd., Kadoma, Japan

[21] Appl. No.: 371,423

[22] Filed: Apr. 23, 1982

[30] Foreign Application Priority Data

Apr. 27, 1981 [JP] Japan .................................. 56-63783

[51] Int. Cl.$^3$ ............................................. F16D 27/10
[52] U.S. Cl. .................... 192/52; 192/84 C; 192/84 R
[58] Field of Search ................. 192/84 C, 84 B, 84 R, 192/52, 53 D

[56] References Cited

U.S. PATENT DOCUMENTS

| 3,044,594 | 7/1962 | Bernard | 192/84 C |
| 3,055,475 | 9/1962 | Pitts | 192/84 C |
| 3,205,989 | 9/1965 | Mantey | 192/84 C |
| 4,190,141 | 2/1980 | Bennett et al. | 192/84 C |
| 4,273,226 | 6/1981 | Takefuta et al. | 192/84 T |
| 4,285,421 | 8/1981 | Halsted | 192/84 C |

Primary Examiner—Rodney H. Bonck
Assistant Examiner—James J. Merek
Attorney, Agent, or Firm—Cushman, Darby & Cushman

[57] ABSTRACT

An electromagnetic clutch comprises a driving member (1) comprising a pulley yoke (105) and a touching part (103), an electromagnet (2) magnetically coupled to the yoke (105), a driven member (4) to be connected to a shaft of a load machine and having at least two ring-shaped armatures, an inner armature (7) and an outer armature (8) independent movably connected by a spring member (5) to said driven member (4); and by making the attracting motion characteristic of the two armatures different from each other, a clutching face of the inner armature (7) firstly contact the touching part (103) and that of the outer armature (8) subsequently contact the same, thereby attaining gradual and gentle coupling.

10 Claims, 11 Drawing Figures

ELECTROMAGNETIC CLUTCH

BACKGROUND OF THE INVENTION

1. Field of the Invention

The present invention relates to an improvement in an electromagnetic clutch.

2. Prior Art

An exemplary conventional electromagnetic clutch is constructed as shown by FIG. 1, which is a sectional view taken by a sectional plane including an axis of the clutch wherein a ring-shaped armature 7′, which also serves as moving clutch member, is resiliently held by a spring member 5 on a flange shaped part 41 of an output member or driven member 4, which is to be connected to a shaft of a load machine. A connection between the spring member 5 and the armature as well as a connection between the spring member 5 and the driven member 4 are provided by rivets 6 and 69. A revolving yoke 1 formed in a ring-shape and having a driving member, for example, a belt pulley 11 fixed integrally to the peripheral face thereof is rotatably journaled by a ball bearing 3, which is fixed, for example, onto a frame of the load machine (not shown). An electromagnet 2 of a ring-shape is held in a stationary manner on a frame 21, which is fixed, for example, to the frame of the load machine by bolts or the like means. The electromagnet 2 is disposed in the revolving yoke 1 in a magnetic coupling manner, so that magnetic flux $\phi$ is induced as shown by chain arrow lines even when the revolving yoke 1 is revolving. The magnetic flux $\phi$ flows through a path from an electromagnet yoke 22, through inner or outer cylindrical yoke part 12 or 13, zigzag magnetic path formed by the armature 7′ with a ring-shaped groove and the touching part 101 with two concentric ring-shaped grooves 102 and 103, the outer or inner cylindrical yoke part 13 or 12, and to the electromagnet yoke 22. The above-mentioned single disk type conventional clutch of FIG. 1 has the following problems:

(1) Because the single clutch disk 7 of a large area instantly touches the touching part 101 of the driving member 1, after first contact of the clutch disk 7 to the touching part 101 the clutch disk 7 makes undesirable chattering (repetitions of many times of contacts and departs) and pulsive or vibrating slips, thereby making transmitted torque and transmitted revolution speed irregularly and pulsively increase and making a strong shock (sharp peak Tp of torque) as shown by FIG. 2. This is caused by a contact by single disk that causes instantaneous bitings (minute parts' melting by friction heat leading to bonding of clutch disk 7 and the touching part 101), each followed by departings by a large force between the above-mentioned two parts due to difference of revolving speeds between the two parts at the initial stage. Such phenomena are very much likely to occur when the load machine is a pulsive load such as refrigerant compressor or the like. It was believed for such single disk type clutch, that a rapid motion is desirable since it shortens the time period of the chattering action of the clutch which accelerate wearing of the clutch disk 7 and the touching part 101. Therefore, the designing of the clutch was to increase coupling speed, that is, to shorten the time period of coupling action. But the problem was that such rapid motion induces sharp peak of torque, namely a strong mechanical shock to the system as designated by Tp in FIG. 2, which is harmful not only for clutch itself, but also for the load machine, and often also for the motor.

(2) In order to reduce the shock at the instance of clutch coupling, a torque limiting means may be used. But such means naturally decreases maximum torque to be transmitted; and furthermore, it is not effective for absorption of shocks produced by a condition of a combination of a considerable moment of inertia of the load and a considerable difference of revolving speeds between the clutch disk 7 and the touching part 101.

SUMMARY OF THE INVENTION

The present invention purports to provide an improved electromagnetic clutch capable of coupling without undesirable strong shock and noise.

The present invention is based on a novel idea that to select the time period of motion of the clutch disk longer than the conventional electromagnetic clutches is desirable. In order to realize the idea and to obtain an electromagnetic clutch of reduced shock and noise, the electromagnetic clutch in accordance with the present invention is constructed to comprise:

an electromagnet (2), a driving member (1) for receiving a revolving force and forming a magnetic yoke, the driving member (1) having a touching part (103), the magnetic yoke being magnetically coupled to the electromagnet, a driven member (4) for transmitting revolving power to a load to be connected thereto and at least two substantially ring-shaped armatures (7, 8) disposed concentrically to each other, each having clutching faces opposing to the touching part, each being connected to the driven member (4) through a spring member (5), the two armatures (7, 8) being operable in each-other-independent manner responsive to energization and deenergization of the electromagnet (2).

DESCRIPTION OF THE PREFERRED EMBODIMENTS

Figure 3A:
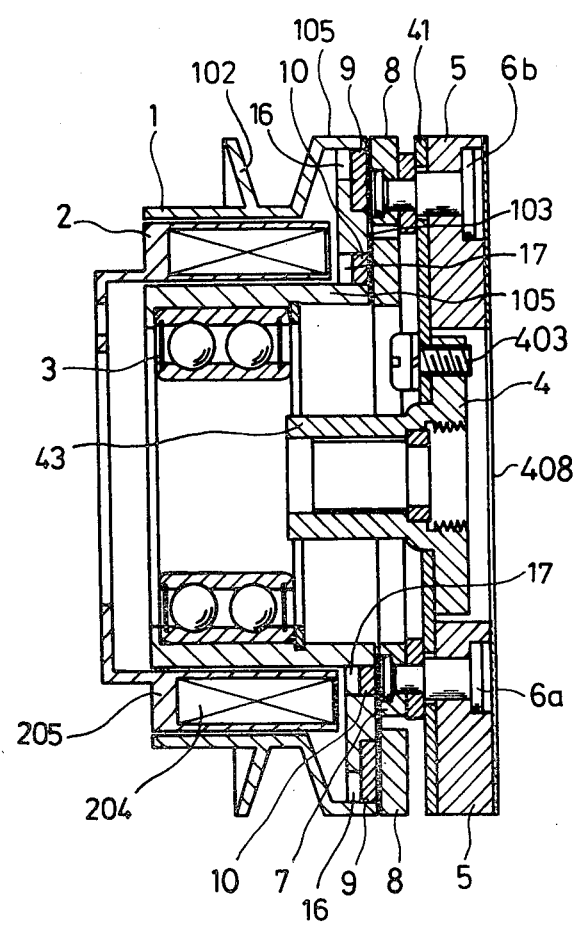
FIG. 3(a) is a sectional view of an example electromagnetic clutch embodying the present invention.
Figure 3:
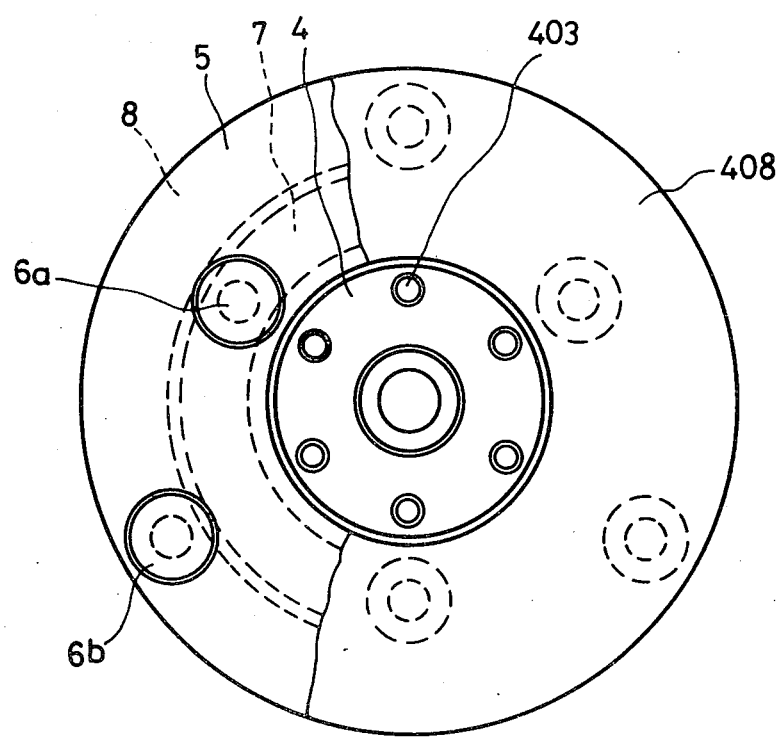
FIG. 3(b) is a partially cut front view of the example electromagnetic clutch of FIG. 3(a).

FIG. 3 is a sectional view taken by a sectional plane including an axis of an electromagnetic clutch embodying the present invention.

As shown in FIG. 3, the electromagnetic clutch embodying the present invention comprises an electromagnet 2 of a ring-shape, a driving member 1 having a yoke part, a driven member 4 to be connected to a load shaft and at least two armatures 7, 8 mounted by spring member 5 on said driven member 4.

The electromagnet 2 is formed in a ring-shape and has a coil 204 and a ring-shaped core 205 and is usually to be fixed to a stationary frame such as a frame of a load machine (not shown), to which revolving power controlled by the electromagnetic clutch is to be supplied.

The driving member 1 is journaled through a ball bearing 3 or the like bearing means on said load machine frame and has a magnetic yoke part 105, through which magnetic flux from the electromagnet 2 flows, and a pulley part 102 for receiving a revolving force through a belt to be engaged thereto and at the same time forming a part of the yoke part 105. The yoke part 105 is so designed as to magnetically couple with the electromagnet 2 even while the former is revolving with respect to the latter so that a magnetic flux generated by the electromagnet 2 flows through the yoke part 105. The driving member 1 also has a clutch face 103, on which at least two ring-shaped contact liners 9 and 10 are disposed in each-other-concentric arrangement. These contact members 9 and 10 also serve as magnetic isolation means for adjusting magnetic absorption forces to absorb the armatures 7 and 8.

The driven member 4 has a core part 43 to be mounted on a shaft of a load machine, for example a refrigerant compressor, and a flange part 41 provided integrally by a bolt 403 to the core part 43. Spring member 5, such as spongy rubber disk is fixed to the flange part 41. And at least two substantially ring-shaped armatures 7 and 8 are mounted the flange 41 by means of a few rivets 6a and 6b on each of the armature 7, 8, in a manner that the rivets 6a and 6b are slidable with respect to the flange 41. The heads of the rivets 6a or 6b are fixed by calking to the armature 7 or 8, respectively and heat-bonded to the spring member 5. As a result of such construction, the outer armature 8 and the inner armature 7 can move independently from each other by deformation of the spring member 5 when the magnetic flux of the yoke absorbs the armatures 7 and 8 at energization of the electromagnet 2, and the armatures 7 and 8 are connected to the flange part 41 by the rivets 6a and 6b in a manner that rotations of the armatures 7 and 8 are transmitted to the flange part 41 by the rivets 6a and 6b. Number of the rivets 6a and 6b should be three or more for each of the inner armature 7 and the outer diameter 8 so that the armatures 7 and 8 are held with its face stably parallel to the clutch face 103. The faces of the armatures 7 and 8 which are opposing to the clutch face 103 form contacting face thereto.

It is to be noted that the feature of the present invention is provision of two or more armatures 7 and 8 having different absorption motion characteristics for magnetic absorptions at energization of the electromagnet 2. By such difference, one of the armatures is absorbed first, and the other one or others are absorbed subsequently, thereby gradually increasing the transmission torque.

Such differences of the absorption characteristics are given by various ways such as follows:

A first way is making differences in the lengths of contacting cylindrical faces of the rod parts of rivets and cylindrical through holes of the spring member 5 such as foamed polyurethane thereby giving larger restoring force to the rivet with longer contacting cylindrical faces than those with shorter contacting cylindrical faces. A second way is making differences in the effective thickness (i.e. thicknesses of under the parts of the rivet heads) of the spring member 5 such as springy foamed polyurethane. A third way is making differences in the effective elasticity of the spring member 5, by making a difference of density thereof or by making an initial thickness thereof under the rivet heads so as to give some compression preliminarily. A fourth way is making differences in the sizes of rivet head diameters, thereby giving a stronger spring action to the rivets of larger diameter head than to those of smaller diameter heads. A fifth way is forming the spring member by a metal spring and making difference of the elasticity by making differences of the size and shape of the partial springs engaging with the rivets.

Figure 4:
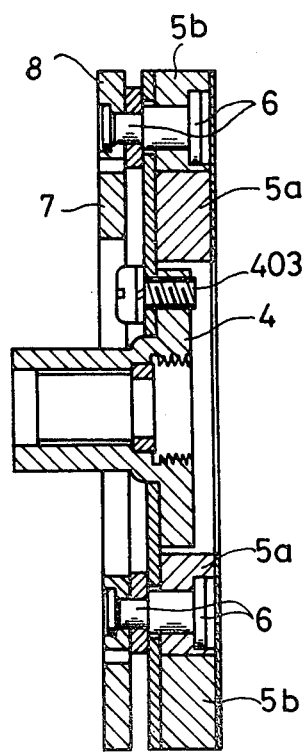
FIG. 4 is a schematic sectional view showing a modified configuration of driven member 4, armatures 7,8 and a spring member 5.
Figure 5:
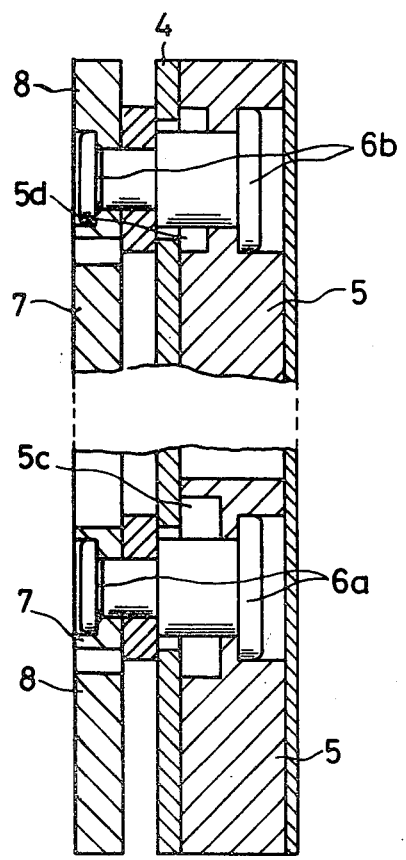
FIG. 5 is a sectional view showing a modified configuration of a driven member 4, armatures 7,8 and a spring member 5a,5b;6a,6b.

A further way is, as shown by FIG. 4, to form inner spring member 5a and outer spring member 5b with different substance of different elasticity, in a manner that the inner spring member 5a is softer than the outer spring member 5b. Still further way is, as shown by FIG. 5, forming different sizes of holes at the foot of the rivet heads with a retained thin walls contacting the rear faces of the rivet heads 6a and 6b, respectively.

In the above-mentioned several ways of making differences of the elasticity of the spring action or restoring action to the armatures 7 and 8, the restoring force for the inner armature 7 should be selected softer than that for the outer armature 8, so that at the energization of the electromagnet 2 the inner armature 7 is absorbed to the clutch face 103 earlier than the outer armature 8. This is preferable because the contact face of the inner armature 7 has lower speed against the corresponding part of the clutch face 103 in comparison with the speed of the contact face of the outer armature 8 against the corresponding part of the clutch face 103, and the first contact by such lower speed contact face followed by second contact by higher speed contact face is desirable in more reasonable than an opposite operation thereto, thereby realizing more gentle quiet and smooth coupling operation, as shown by FIG. 8 to FIG. 10.

Figure 6:
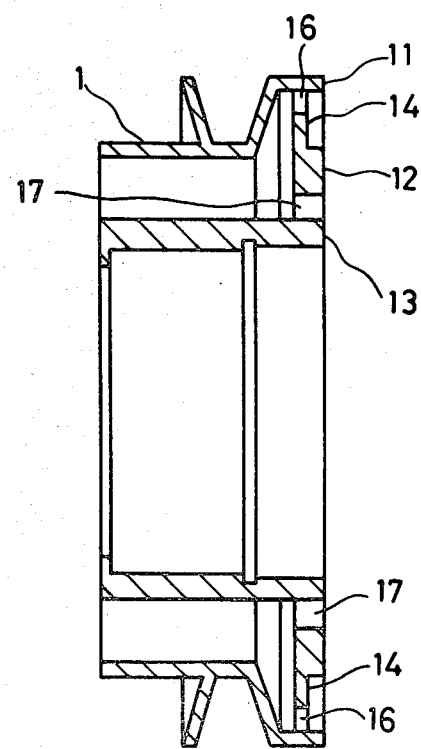
FIG. 6 is a sectional view showing the configuration of a driving member 1.
Figure 7:
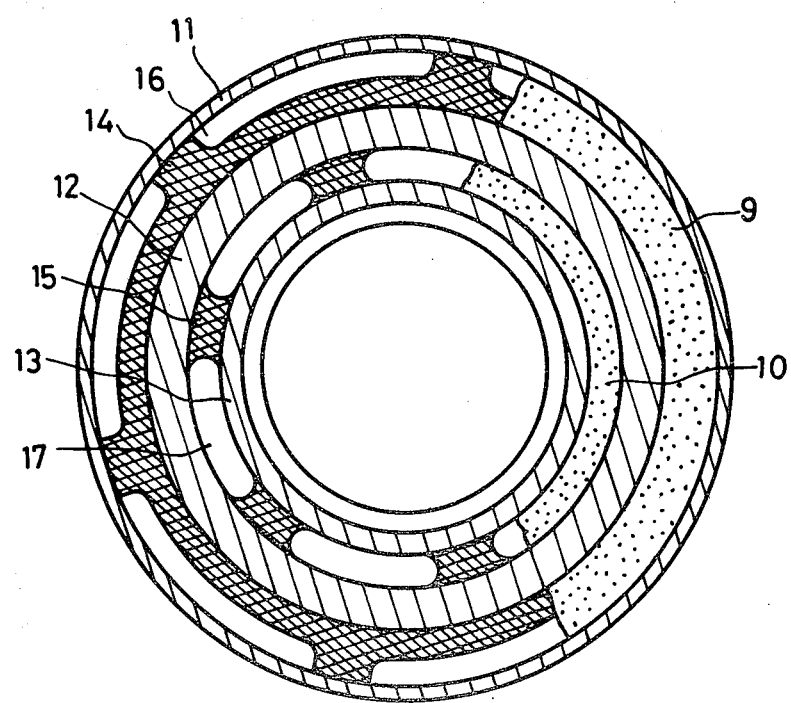
FIG. 7 is a partially cut front view of the driving member 1.

Varying the magnetic absorption and coupling operation of the inner armature 7 and outer armature 8 may be made by design of magnetic path of the armatures 7 and 8 and the clutch face 103 opposing thereto. That is, by intentionally making difference of the effective pole piece areas of the armatures 7 and 8 and the clutch face 103, magnetic flux densities between the clutch face 103 and the contact faces of the armatures 7 and 8 can be considerably made different from each other, thereby making difference of the magnetic absorption forces of the armatures 7 and 8 from each other. As shown by FIGS. 6 and 7, the sectional construction of the clutch face 103 of the driving part 1 has ring-shaped protruding parts 11, 12 and 13 and substantially ring-shaped recessed parts (magnetically isolating parts) 14 and 15, accordingly by selecting the widths in the radial direction of these protruding parts 11, 12 and 13 and the recessed parts 14 and 15, a wide selection in designing the magnetic flux density is feasible.

It is preferable that inner contact liner 10 should be selected to be a substance having smaller friction coefficient than that of the outer contact liner 9. FIG. 7 is a fragmental front view of the clutch face 103, wherein 9 and 10 designate outer and inner clutch disks, 14 and 15 designate bond layer for bonding the clutch disks 9 and 10, respectively, and 16 and 17 designate partial circular grooves for magnetic isolation therewith to produce a zigzag magnetic path. By so selecting, and by designing the armatures 7 and 8 or its spring member 5 in a manner to afford a softer spring action to the inner armature 7, when the electromagnet 2 is energized the inner armature 7 first contacts the inner clutch liner 10 having the lower fraction coefficient, and gradually increases transmission torque to the driven member 4 without making shock or large noise. And only after the revolution speed of the driven member reaches a considerable value, the outer armature 8 makes contact with the outer clutch liner 9 having a higher friction coefficient and completes an entire coupling of the clutch. In case the areas of the inner contact liner 10 and the outer contact liner 9 are made different from each other as shown by FIG. 7, only by this construction a required difference of the torque transmission force is obtainable. A metal cover plate 408 is bonded on the spring member 5.

Figure 8:
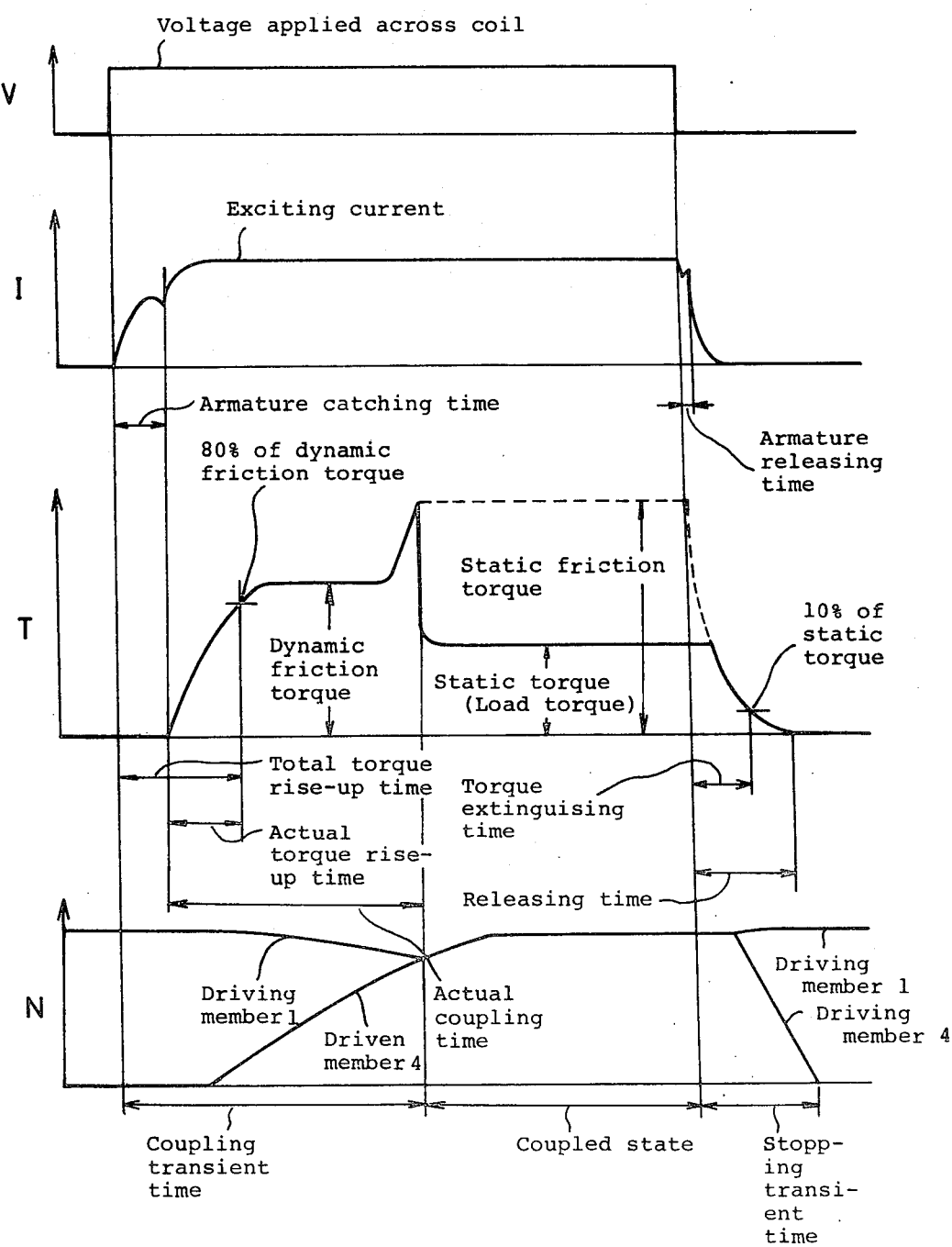
FIG. 8 is a schematic time chart theoretically showing operation of the electromagnetic clutch of FIG. 3.
Figure 9:
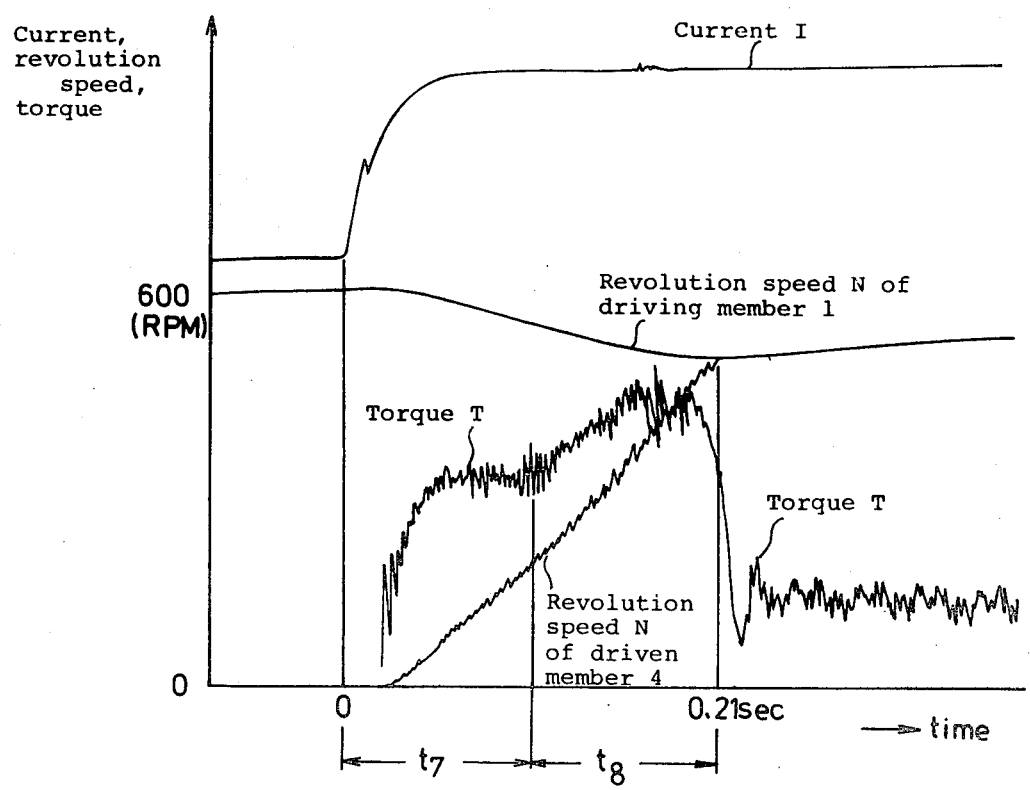
FIG. 9 is a time chart showing operation of the electromagnetic clutch of FIG. 3.
Figure 10:
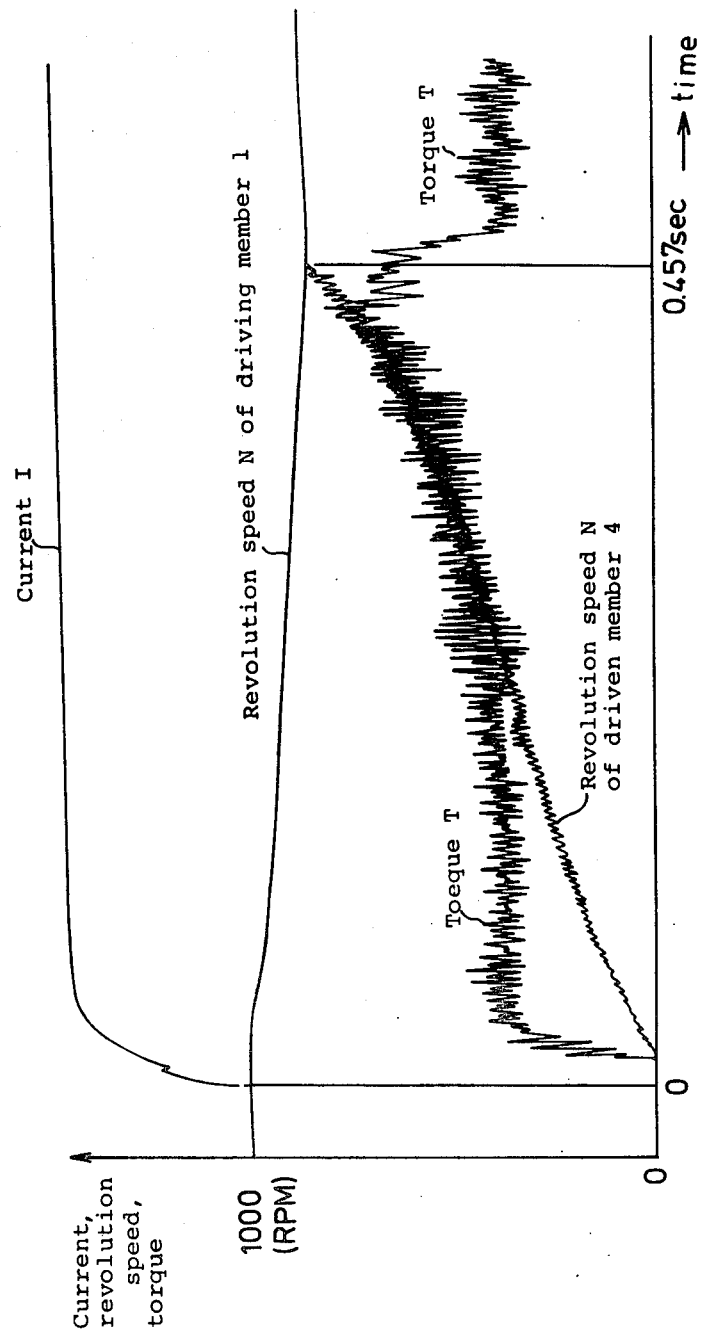
FIG. 10 is a time chart showing operation of the electromagnetic clutch of FIG. 3, modified to perform further improved operation.

The operation of the electromagnetic clutch in accordance with the present invention is elucidated in detail referring to FIGS. 8 to 10.

FIG. 8 is a time chart for showing operation of the general electromagnetic clutch when an ordinary load is connected to the driven member 4. In the chart, abscissa is graduated by time t and the ordinates are graduated from the top to bottom as follows:

V—Voltage impressed across the electromagnet 2.
I—Exciting current of the electromagnet 2.
T—Torque of the driving member 1.
N—Revolution speeds of driving member 1 and the driven member 4.

Figure 1:
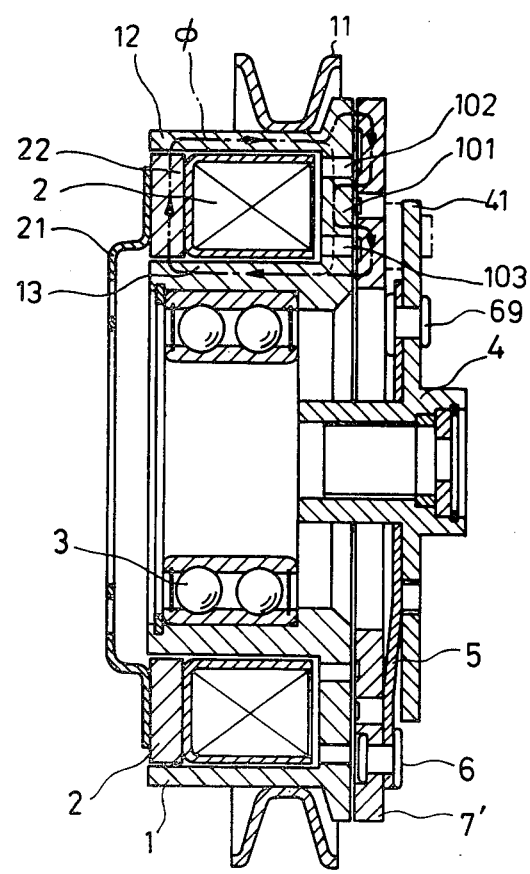
FIG. 1 is a sectional view of an exemplary conventional electromagnetic clutch.
Figure 2:
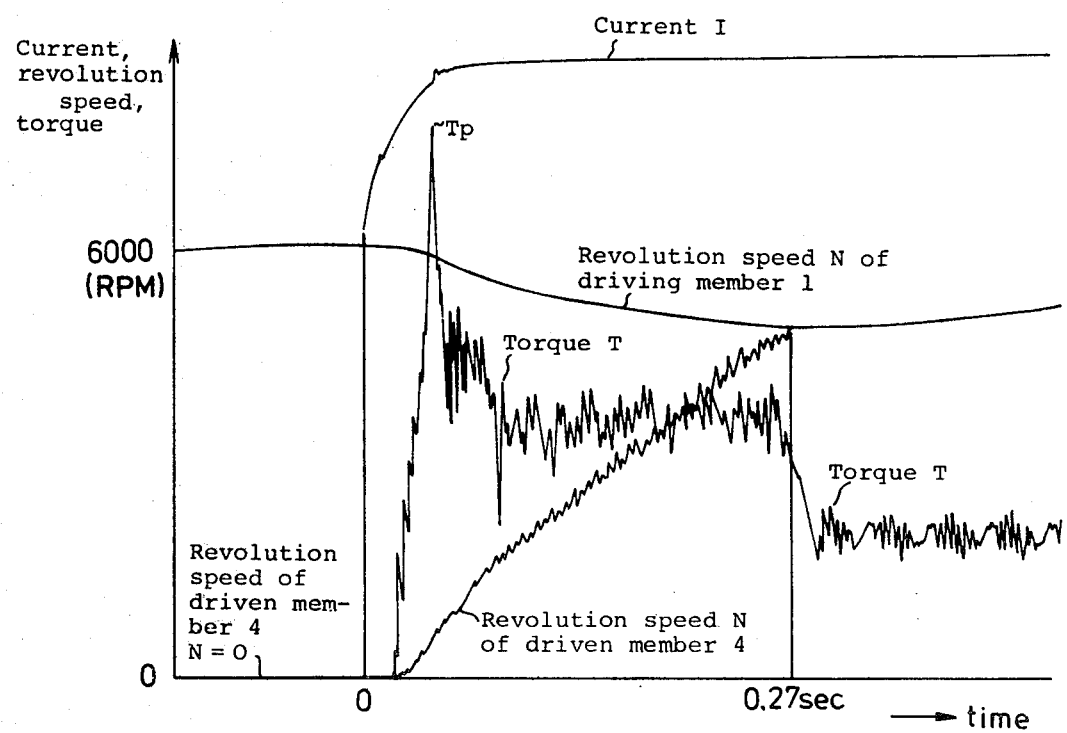
FIG. 2 is a time chart showing actual operation of the electromagnetic clutch of FIG. 1, wherein the abscissa is graduated by time and the ordinate is graduated by the current of the electromagnet, the revolution speeds of the driving member 1 and the driven member 4 and the torque transmitted to the driven member 4.

In the initial period of the clutch coupling, the driven member 4 is accelerated by torque transmission via dynamic friction. The actual torque rise-up time, hence the actual coupling time is determined by the conditions of the stationary revolution speed and moment of inertia of the load machine. As already has been elucidated, it was the way of the conventional design to select the coupling time as short as possible in order to reduce wearing of the clutch faces, wherein a sharp peak of torque (namely shock) of the driving member arises at the initial shape of the coupling operation, and thereafter a torque transmission by the dynamic friction follows, as shown by FIG. 2. In the case of the operation of the electromagnetic clutch in accordance with the present invention, since the contact face of the inner armature 7 first gradually transmit the torque, and thereafter the outer armature 8 works to complete the coupling, there is no undesirable sharp peak of torque or shock arises and the torque transmission increase is gradual and gentle as shown by FIG. 9, which is an automatic machine recorded chart of the example of FIG. 3. In the curve T of the torque, the time period $t_7$ corresponds that of the coupling of the inner armature 7 and the time period $t_8$ corresponds that of the coupling time of the outer armature 8. In this example, the effective areas $S_i$ and $S_o$ of the contacting faces of the inner armature 7 and that of the outer armature 8 are selected to have the relation of $$S_i:S_o=1:2,$$

and the friction coefficient, spring member characteristic and rivet head sizes for both inner diameter 7 and the outer diameter 8 are selected substantially equal.

FIG. 10 is automatic recorded time chart of another example wherein the actual coupling time is selected considerably long by selecting the aforementioned conditions, and this type of the apparatus is suitable for a load of a large moment of inertia and having a relatively small diameter of its input shaft. In this example, the areas $S_i$ and $S_o$ of the contacting faces of the inner armature 7 and that of the outer armature 8 are selected to have the relation of $$S_i:S_o=0.8:2.$$

The present invention is applicable to further modified electromagnetic clutches where three or more concentrically disposed ring-shaped armatures, which have different characteristics of motion at magnetic absorption by the electromagnet 2.

Still another practical usage of the electromagnetic clutch of the present invention is that to energize the electromagnet (1) at the initial stage by an exciting current which is larger than a minimum attraction current for the inner armature 7 and smaller than a minimum attraction current for the outer armature 8, thereby to attract only the inner armature 7, and (2) at the subsequent stage by a rated exciting current which is larger than the minimum attraction current for the outer armature 8, thereby adding the attracting of the outer armature 8 to complete the entire coupling of the clutch. By such two step energizations of the electromagnet, a gradual and gentle coupling for desirably designed transient coupling time is attainable.

The electromagnetic clutch in accordance with the present invention can be realized with a wide variety of coupling characteristics, and afford gentle or quiet operations and reliable long life services for a higher frequency use clutch.

What is claimed is:
1. An electromagnetic clutch comprising:
an electromagnet,
a driving member for receiving a revolving force and forming a magnetic yoke, said driving member having a touching part, said magnetic yoke being magnetically coupled to said electromagnet,
a driven member for transmitting revolving power to a load to be connected thereto,
at least two armatures of substantially ring shape of different sizes, including an inner armature and an outer armature disposed concentrically to each other, each said armature having clutching faces opposing to said touching part,
each said armature being connected to said driven member through a spring member, said spring member connecting said inner armature having a larger compliance than that of said spring member of said outer armature, whereby said two armatures are operable independently of one another in response to energization and deenergization of said electromagnet to allow said inner armature to transmit revolution torque prior to the outer armature.

2. An electromagnetic clutch in accordance with claim 1, wherein
area of magnetic paths to said inner armature and said outer armature are selected to make a difference in magnetic flux density thereof to allow said inner armature to transmit revolution torque prior to the outer armature.

3. An electromagnetic clutch in accordance with claim 2, wherein:
said electromagnet is energized at the initial stage by an exciting current which is larger than a minimum attraction current for said inner armature and smaller than a minimum attraction current for said outer armature, thereby to attract only said inner armature, and
at the subsequent stage by a rated exciting current which is larger than said minimum attraction current for said outer armature thereby adding the attracting of said outer armature to complete the entire coupling of the clutch.

4. An electromagnetic clutch in accordance with claim 1, wherein
coefficients of friction between contacting faces of said touching part of driving member and clutching faces of said inner armature and said outer armature are selected such that the coefficient of friction for said inner armature is smaller than that for said outer armature.

5. An electromagnetic clutch in accordance with claim 1, wherein said touching part of the driving member has two substantially ring-shaped through hole grooves disposed in concentric relation and two ring-shaped clutch linings of different coefficients of friction from each other disposed above said substantially ring-shaped through hole grooves.

6. An electromagnetic clutch in accordance with claim 1, wherein said electromagnet is constructed and arranged to be energized
at the initial stage by an exciting current which is larger than a minimum attraction current for said inner armature and smaller than a minimum attraction current for said outer armature, thereby to attract only said inner armature, and
at the subsequent stage by a rated exciting current which is larger than said minimum attraction current for said outer armature thereby adding the attracting of said outer armature to complete the entire coupling of the clutch.

7. An electromagnetic clutch in accordance with claim 1, wherein
said armatures are connected by means of rivets and the inner armature is connected by rivets of smaller head size than those connecting the outer armature.

8. An electromagnetic clutch in accordance with claim 1, wherein
said armatures are connected by means of rivets and the inner armature is connected by rivets of a shorter rod part than those connecting the outer armature.

9. An electromagnetic clutch in accordance with claim 1, wherein
opposing areas of contacting faces of said touching part and the clutching faces of said armatures are made different from each other in such a manner that said contacting face and said clutching face for said inner armature is smaller than those for the outer armature.

10. An electromagnetic clutch in accordance with claim 1, wherein
said spring member connecting said armatures is a spongy substance to which said armatures are connected by means of rivets, the spongy substance having vacant space under heads of said rivets with a supporting part of a predetermined thickness of the same substance immediately under said heads, and vacant spaces for said inner armature being larger than those for said outer armature.

* * * * *